Dec. 5, 1933.  J. R. HAMILTON  1,937,654
PIPE HANGER
Filed Feb. 27, 1932
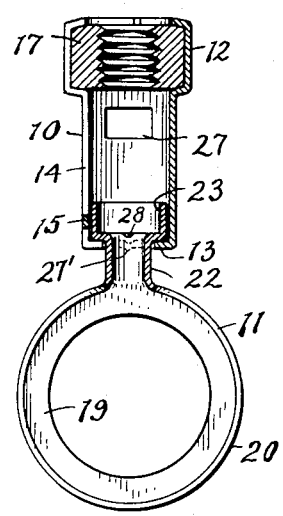
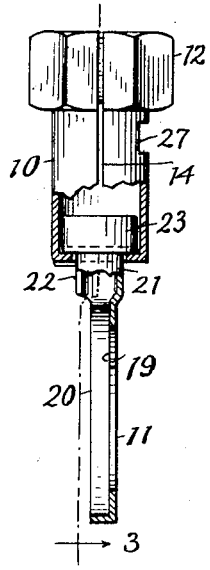
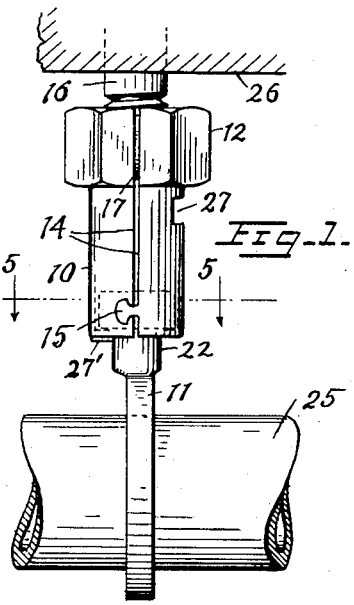
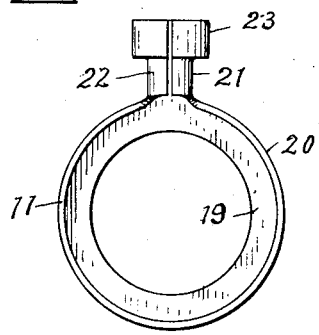
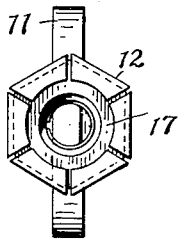
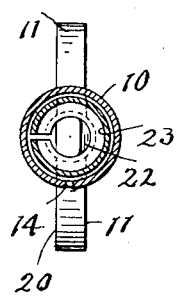
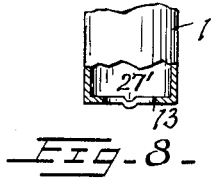
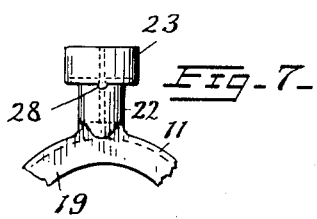
Inventor
JOHN R. HAMILTON.
Kwm Hudson & Kent
attys.

Patented Dec. 5, 1933

1,937,654

UNITED STATES PATENT OFFICE 1,937,654

PIPE HANGER

John R. Hamilton, Cleveland, Ohio, assignor to "Automatic" Sprinkler Company of America, Cleveland, Ohio, a corporation of Delaware Application February 27, 1932. Serial No. 595,630

5 Claims. (Cl. 248—31)

This invention relates to article supporting devices and more particularly to a novel form of pipe hanger.

An object of this invention is to provide an efficient and durable form of pipe hanger which can be very economically constructed.

Another object of this invention is the provision of an efficient pipe hanger which is composed of parts constructed from sheet metal.

Other objects and advantages of this invention will be apparent from the following description when taken in conjunction with the accompanying sheet of drawings, wherein, Fig. 1 is an elevational view showing an installation made with a pipe hanger constructed according to my invention;

Fig. 2 is an elevational view of the pipe hanger, with parts thereof in section;

Fig. 3 is a sectional view taken substantially on line 3—3 of Fig. 2;

Fig. 4 is a top plan view of the pipe hanger;

Fig. 5 is a transverse sectional view taken substantially on line 5—5 of Fig. 1;

Fig. 6 is a detached elevational view of the pipe engaging member;

Fig. 7 is a partial side elevational view of the pipe engaging member, and

Fig. 8 is an elevational view, partly in section, showing the lower end of the sleeve member.

In the accompanying drawing illustrating my invention, I have shown an efficient and durable pipe hanger, which is composed of members formed of sheet metal, and which can be very economically constructed. In disclosing my invention, I have made detailed reference to a preferred form of the device, which is illustrated in the drawing, but it should be understood, however that the invention is not to be regarded as limited to this detailed construction, but may be embodied in various other structural forms and arrangements.

In general, the pipe hanger of my invention comprises a sleeve member 10, which is adapted for cooperation with a threaded anchor or other support and may be of any suitable shape or size, and a pipe engaging member 11, which is swivelly connected to the sleeve member. According to my invention, the sleeve member and the pipe engaging member are formed from sheet metal, such as sheet steel, by the use of suitable dies or other apparatus adapted to perform stamping, drawing or rolling operations, or by the use of various combinations of such apparatus and operations.

In this instance, the sleeve member 10 comprises an elongated hollow tubular body, which is preferably of substantially cylindrical cross-sectional shape, and which is provided at the upper end thereof with an integrally formed socket 12. At its lower end this sleeve member is provided with an inwardly extending integral flange 13. This sleeve member may be constructed in any suitable manner, but is preferably formed from an appropriately shaped piece of sheet metal by rolling the latter into the tubular form shown in the drawing. The sleeve member may be retained in tubular form by the use of any suitable means which will prevent separation of the contiguous edges 14, such as spot welding. I prefer, however, to prevent separation of these edges by the provision of an integral projecting lug 15 on one edge, which engages in a correspondingly shaped recess in the adjacent edge. The lug 15 may be formed during the blanking operation that produces the sheet metal body from which the sleeve member is rolled and, when made in this way, the formation of the lug on the edge of one body simultaneously forms a correspondingly shaped recess in the edge portion of an adjacent body. As shown in Fig. 1, the lug 15 is so shaped that when pressed into the recess of the adjacent edge, it provides a dovetail connection which effectively prevents separation of these edges and thus retains the sleeve member in tubular form.

For connecting the sleeve member 10 with an available support, such as the threaded anchor member 16, I provide an internally threaded body 17, which is mounted in the integrally formed socket of the sleeve member. The integrally formed socket of the latter member may be of any suitable shape, but, as shown in the drawing, is preferably in the form of a hollow shell of polygonal or other non-circular shape. The threaded body 17 is shaped to correspond with the integrally formed socket, and in this instance is shown as a hexagon nut which will be held against rotation relative to the sleeve member when it is assembled in the socket. If desired, additional connecting means may be provided between the threaded body and the sleeve member, in the form of spot welding which, when used, also assists in retaining the sleeve member in tubular form by preventing separation of the contiguous edges 14.

The pipe engaging member 11 is also formed of sheet metal, and comprises a ring portion 19 having an angularly disposed reinforcing bead or flange 20 extending around its outer edge, and an integrally formed connecting portion 21 which is swivelly connected with the sleeve member 10.

This connecting portion comprises neck and head sections 22 and 23, which are formed by rolling portions of the sheet metal of the pipe engaging member into the tubular form illustrated in the drawing. As shown in Figs. 2 and 3, the head portion 23 is somewhat larger in diameter than the neck portion 22, so that when the members are assembled, as shown in Fig. 3, the head portion will be retained in the sleeve member by the laterally extending flange 13, thereby providing a swivel connection between the pipe engaging member and the sleeve member.

In using my pipe hanger, the ring portion 19 of the pipe engaging member is slipped onto the pipe section to be supported, such as the section 25 represented in Fig. 1, and the internally threaded body of the sleeve member is applied to the threaded anchor member 16, which projects from a ceiling or other supporting structure 26. By rotation of the sleeve member the threaded body mounted therein is connected to the anchor member 16, rotation of the sleeve member relative to the pipe engaging member being permitted by the swivel connection between these members.

In order that the pipe fitter may know when the sleeve member has been rotated enough to establish a proper connection with the anchor member 16, I provide a window opening 27 in the side wall of the sleeve member. As shown in the drawing, this opening is located adjacent to the lower end of the threaded body 17, so that the pipe fitter may know, by observation, when the lower end of the anchor member has traveled through the threaded body and a proper threaded connection has been established.

To prevent the body 17 from becoming unscrewed from the anchor member 16, as might occur if the pipe hanger is subjected to vibration, I provide means for interlocking the pipe engaging member and the sleeve member. Although various forms of interlocking means may be employed, I prefer to form the laterally extending flange of the sleeve member with a recess or depression 27' therein for cooperation with a lug 28 formed integral with the head portion 23. When the pipe hanger has been installed, it will be seen that the weight of the pipe line will cause the lug 28 to engage in the recess 27', to thereby resist rotation of the sleeve member and prevent the threaded body from becoming unscrewed.

It will now be readily seen that I have provided an efficient and durable form of pipe hanger comprising parts, which are formed from sheet metal and which can be very economically constructed. Likewise, it will be seen that since the parts of my pipe hanger are constructed of sheet metal, which inherently possesses a relatively high tensile strength, these hangers are less likely to be broken than the relatively brittle cast metal and malleable iron pipe hangers heretofore used.

While I have illustrated and described the device of my invention in a detailed manner, it should be understood, however, that I do not intend to limit myself to the precise details of construction and arrangements of parts illustrated and described, but regard my invention as including such changes and modifications as do not involve a departure from the spirit of the invention and the scope of the appended claims.

Having thus described my invention, I claim:

1. A pipe hanger comprising a sleeve formed of sheet metal rolled into tubular shape, said sleeve being provided at one end thereof with an integrally formed non-circular portion having thread engaging means therein and at its opposite end with laterally extending retaining means, and a pipe engaging member having a head portion swivelled in said sleeve in engagement with said retaining means.

2. A pipe hanger comprising a sheet metal body formed into tubular shape, said body being provided at one end thereof with an integrally formed socket and at its opposite end with an inturned flange, a threaded member non-rotatably mounted in said socket, and a pipe engaging member having a head swivelly retained in said body by said inturned flange.

3. A pipe hanger comprising a tubular sheet metal body, a connecting member non-rotatably mounted in said body at one end thereof for engagement with a support, retaining means at the other end of said body, and a pipe engaging member having a head swivelly disposed in said body in engagement with said retaining means.

4. A pipe hanger comprising a sleeve formed of sheet metal rolled into tubular shape, said sleeve being provided with an integrally formed socket at one end thereof and a laterally extending flange at its opposite end, a threaded member non-rotatably mounted in said socket, a pipe engaging ring formed of sheet metal and having an integral tubular head movably disposed in said sleeve and retained therein by said laterally extending flange.

5. A pipe hanger comprising a sleeve formed of sheet metal and having a polygonal portion adapted to receive a wrench, said polygonal portion having a threaded nut fitting the interior thereof and secured therein, said sleeve having an inturned flange at one end, and a pipe-engaging member having a head arranged in said sleeve and supported for swivelling movement by said flange.

JOHN R. HAMILTON.